United States Patent [19]

Lawrence et al.

[11] 4,439,826
[45] Mar. 27, 1984

[54] DIAGNOSTIC SYSTEM FOR A DISTRIBUTED CONTROL SWITCHING NETWORK

[75] Inventors: Alan J. Lawrence, Shelton; Daniel C. Upp, Easton, both of Conn.

[73] Assignee: International Telephone & Telegraph Corporation, New York, N.Y.

[21] Appl. No.: 284,866

[22] Filed: Jul. 20, 1981

[51] Int. Cl.³ .............................................. G06F 11/00
[52] U.S. Cl. ............................. 364/200; 179/18 EA
[58] Field of Search ........................... 364/200, 900; 179/175.2 R, 18 ES, 18 J, 18 E, 18 EA

[56] References Cited

U.S. PATENT DOCUMENTS

| | | | |
|---|---|---|---|
| 3,585,599 | 6/1971 | Hitt | 364/200 |
| 3,725,864 | 4/1973 | Clark et al. | 364/200 |
| 3,760,364 | 9/1973 | Yamauchi et al. | 364/200 |
| 3,967,250 | 6/1976 | Senda et al. | 364/200 |
| 3,980,839 | 9/1976 | Hutcheson | 179/175.2 R |
| 4,195,351 | 3/1980 | Barner et al. | 179/18 EA |
| 4,201,891 | 5/1980 | Lawrence et al. | 179/18 EA |
| 4,211,916 | 7/1980 | Baxansky et al. | 364/200 |
| 4,220,990 | 9/1980 | Alles | 364/200 |
| 4,256,926 | 3/1981 | Pitroda et al. | 364/200 |

Primary Examiner—Jerry Smith
Assistant Examiner—Michael R. Fleming
Attorney, Agent, or Firm—John T. O'Halloran; Jeffery P. Morris

[57] ABSTRACT

A diagnostic system for a telecommunications system including a digital switching network is controlled via a plurality of data processors. Each of the distributed data processors has a unique address and has diagnostic data stored therein for use in performing diagnostics in the switching network. The switching network includes digital switching elements, each having bidirectional ports for receiving and transmitting digital signals, and each of the bidirectional ports also having a unique address in the network. Diagnostic paths are established under processor control between the digital switching elements and the data processors. Each of the data processors is interconnected to another data processor by connection paths equal in number to the number of bidirectional communication paths originating from such data processor so that the addresses of the data processors are algorithimically related to the addresses of the bidirectional ports interconnected by the diagnostic paths, thereby achieving a simplified and reliable protocol for data transfer from processor to processor.

18 Claims, 11 Drawing Figures

SP – SPARE
* – INCOMPLETE TUNNEL

DIAGNOSTIC SYSTEM FOR A DISTRIBUTED CONTROL SWITCHING NETWORK

BACKGROUND OF THE INVENTION

The present invention relates to distributed control digital switching systems and more particularly to a diagnostic system for locating faults at any of the switching elements in the network.

Such digital control switching systems have particular application to telephone exchanges for providing expandable subscriber line/trunk traffic capacity for toll, tandem, rural, local, concentration and expansion applications. Such a system is described in U.S. Pat. No. 4,201,890, entitled, MULTIPORT DIGITAL SWITCHING ELEMENT, issued on May 6, 1980, in the names of Alan J. Lawrence, Jeffrey N. Denenberg, Murray Rubinstein, and Daniel C. Upp, asigned to the same assignee as the present invention, the disclosure of which is herein incorporated by reference. In such a system, certain of the data processing functions associated with groups of telephones or other terminals are provided by one group of processors, while other processing functions associated with different and larger groups of telephones or other terminals are provided independently by a second group of processors, while communication and data exchange between the two groups of processors is provided over common transmission paths interconnected through a digital switching network. Moreover, such a system include multiport switching elements characterized in that the ports thereof function either as inlets or outlets depending only upon the network application requirements, for providing one-sided, two-sided or multi-sided switches in the network. Advantageously, there is no separately identifiable control or centralized computer complex, since the control for the switching network is distributed in the form of multiple processors throughout the subsystems, with such distributed processors providing groups of necessary processing functions for the subsystems serviced. Thus, groups of control functions for certain subsystems are performed by processors dedicated to those subsystems; however, other processing functions of the same subsystems which may be more efficiently performed by other processors are performed by such other processors.

Also, a digital switching network architecture is provided wherein not only are multichannel digitized PCM speed samples or data transmitted between one terminal and another intercoupled by the network, but the same channels also contain the path selection and control signals for the distributed control, which are carried on the same transmission paths through the network. Every terminal, whether carrying data from a line or trunk or other data source, is serviced by a terminal unit which contains all of the facilities and control logic to communicate with other terminals via other terminal units and to establish, maintain and terminate paths through the switching network to other terminal units. All interprocessor communication is routed through the switching network. The switching network includes a group switch containing switching elements providing both time and space switching which is modularly expandable without disruption of service or rearrangement of existing interconnections to provide a growth from, for example, 120 to 128,000 or more terminals, to accommodate increasing traffic load while performing as an effectively non-blocking network.

Providing and maintaining service of a specified quality in a digital switching network, under variable transmission conditions while allowing for network growth and unavoidable equipment failure, requires a system for diagnosis and fault detection. It is known to provide fault detection apparatus in serial loop data transmission systems. For example, U.S. Pat. No. 3,564,145 discloses such a system in which terminals monitor the input data and generate signals including the unique terminal address which are provided to a central controller. However, such a serial fault detection system would have severe limitations in a distributed digital switching network, since a serial fault detection system would interfere with the flow of working data to the digital switches.

SUMMARY OF THE INVENTION

The present invention describes a diagnostic system for a distributed control switching network interconnected to a plurality of data processors, each of the data processors having a unique address and diagnostic data stored therein for use in the switching network, comprising digital switching elements, each of the digital switching elements including a plurality of bidirectional ports for receiving and transmitting digital signals, each of the bidirectional ports having a unique address in the network, means for providing a plurality of bidirectional communication paths from each of the data processors to certain of the digital switching elements, and means providing diagnostic paths between the digital switching elements and the data processors, each of the data processors being interconnected to another data processor by connection paths equal in number to the number of bidirectional communication paths originating from the data processor, so that the addresses of the data processors are algorithimically related to the addresses of the bidirectional ports connected thereto by the diagnostic paths. The algorithmic relationship simplifies the identification of ports and the transfer of data therebetween, so that processor controlled diagnostics can be achieved reliably and at less cost than in systems of the prior art.

It is an object of the present invention to provide a diagnostic system for a distributed control digital switching network capable of locating faults present in any of the digital switching elements.

It is a further object of the present invention to provide a diagnostic system for a digital switching network which does not interfere with the normal flow of working data.

It is a still further object of the present invention to provide a diagnostic system for a distributed digital switching network which provides full diagnostic capability for all the switching elements and eliminates any need to take off-line any of the digital switches during the diagnosis.

Other objects and advantages of the present invention will be apparent from the detailed description of the preferred embodiment of the invention, taken together with the drawings, as follows:

DESCRIPTION OF THE PREFERRED EMBODIMENT

Figure 1:
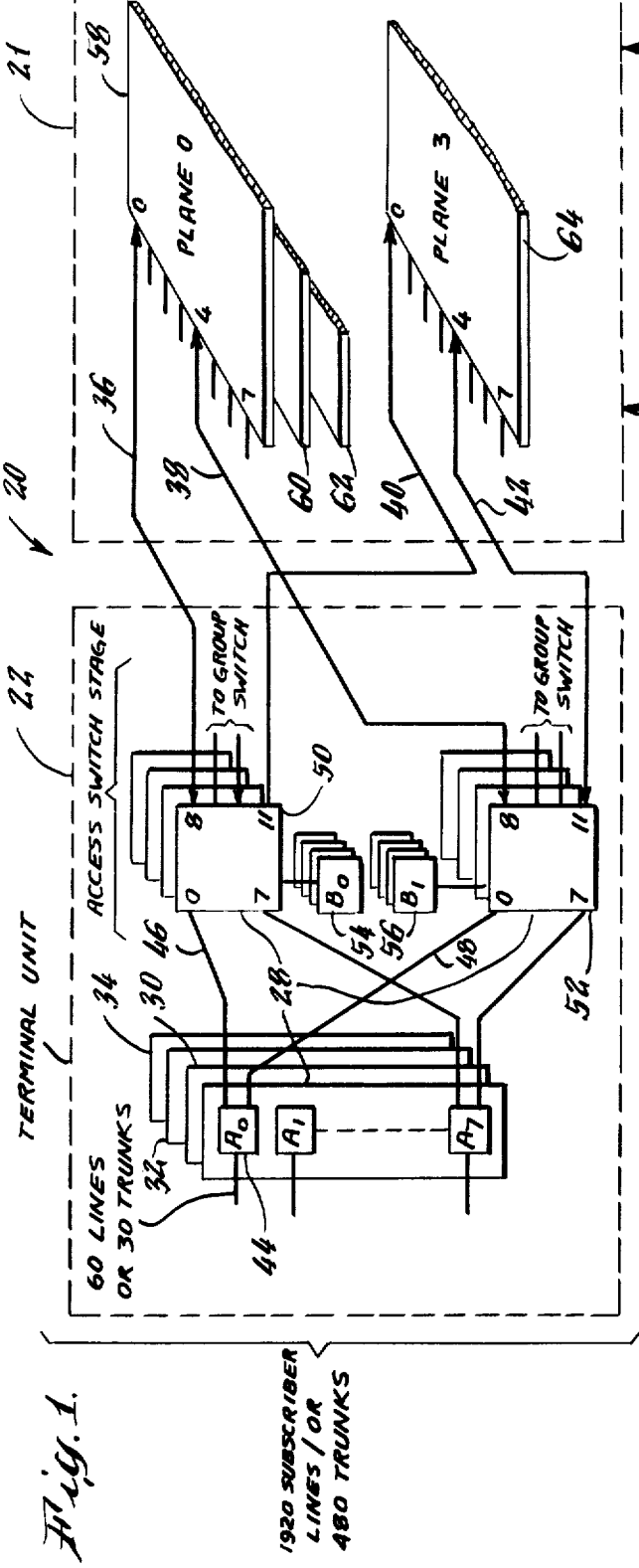
FIG. 1 is a block diagram of a distributed control switching network in which the diagnostic system of the present invention is used.

Referring to FIG. 1, a distributed control digital switching system is illustrated generally at 20, having a group switch 21 through which a plurality of connections between terminal units, here indicated as 22, 24 and 26, are switched to provide transmission paths for coupling data between terminals serviced by the terminal units. As used herein a terminal unit is a subsystem for servicing a group of terminals which terminate on one frist stage switch in every plane of the group switch 21. Each terminal unit 22, 24 and 26 includes eight access switches through which data from the terminals is coupled to and from the group switch 21. As used herein, a terminal subunit is a subsystem of a terminal unit for servicing a group of terminals which terminate on one security pair of access switches. Each terminal unit 22, 24 and 26 contains four security pairs of access switches. The PCM data present at each terminal is derived, for example, from telephone line circuits which may be of the type described in detail in U.S. Pat. No. 4,161,633, entitled, SUBSCRIBER LINE/TRUNK CIRCUIT, issued July 17, 1979, in the name of Robert Treiber, and assigned to the same assignee as the present invention.

Although terminal units 22, 24 and 25 are shown, it should be understood that up to 128 terminal units or more may be switched by the group switch 21. Each terminal unit has the capability of interfacing, for example, 1920 subscriber line terminals or 480 trunks to four terminal subunits. Terminal subunits 28, 30, 32 and 34 are illustrated in terminal unit 22.

Thirty-two channel PCM multiplexed digital lines having multiplexed thereon thirty bidirectional subscriber lines are coupled to each of the terminal units 22, 24 and 26. Each terminal unit, such as terminal unit 22, is coupled to group switch 21 by a plurality of multiplexed transmission links, each transmission link comprising two unidirectional transmission paths. Each terminal subunit, 28, 30, 32 and 34 of terminal unit 22 is coupled to each plane of the group switch 21 by two such transmission links. For example, for terminal subunit 28, transmission links 36 and 38 are illustrated as coupling terminal subunit 28, to plane 0 of group switch 21 and transmission links 40 and 42 couple terminal subunit 28 to plane 3 of group switch 21. Similarly, terminal subunit 28 is coupled to planes 1 and 2 of the group switch 21 by similar transmission links. Subunits 30, 32 and 34 are also coupled to every plane of the group switch 21 in like manner as terminal subunit 28.

Each transmission link 36, 38, 40 and 42 shown for terminal subunit 28 is bidirectional in that it includes a pair of unidirectional transmission paths, each path being dedicated to one direction of data flow. Each unidirectional transmission path carries thirty-two channels of digital information time division multiplexed (TDM) thereon in bit-serial format. Each TDM frame is comprised of the thirty-two channels, with each channel having 16-bits of information per frame, and at a bit transmission rate of 4.096 mb/s. This transmission rate is clocked throughout the system, hence, the system may be characterized as rate synchronous.

Figure 2:
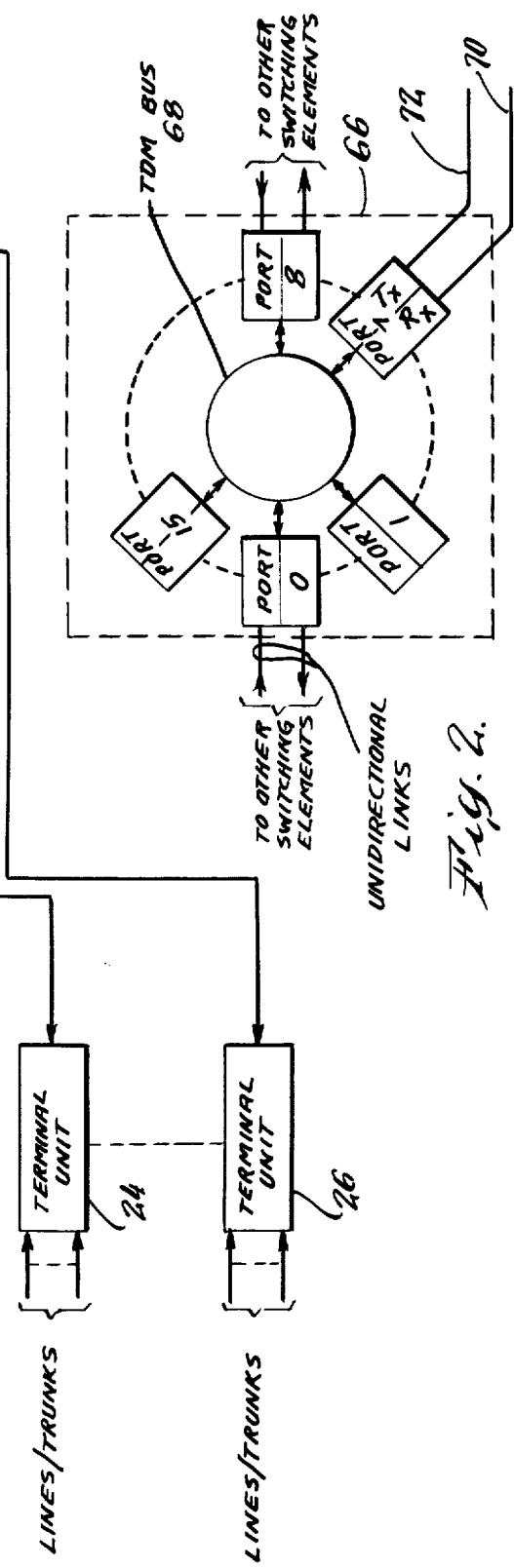
FIG. 2 is a simplified block diagram of a multiport digital switching element.

Since the system is also phase asynchronous, there is no required phase relationship in which data bits in a frame are received by different switching elements or by the different ports in a single switching element. This rate synchronous and phase asynchronous switching system is implemented in the group switch 21 and in the access switches by a plurality of multiport switching elements, as illustrated by FIG. 2. When digital speech samples are transmitted within the system to or from a particular terminal, the digital speech samples must be time multiplexed into the correct channels on the transmission links between switching elements used to connect the terminals. Time slot interchange is provided by each switching element, since the channels used to interconnect the terminals may vary. Time slot interchange, i.e., the transposition of data on one channel to another channel is well known and described, for example, in U.S. Pat. No. 4,173,713, entitled, CONTINUOUSLY EXPANDABLE SWITCHING NETWORK, issued Nov. 6, 1979, in the names of Kenneth F. Giesken and John M. Cotton, and assigned to the same assignee as the present invention.

As illustrated in FIG. 1, two groups of processors are included within each terminal subunit, such as terminal subunit 28, the first group of processors, shown as processors $A_0, A_1, \ldots A_7$, are each dedicated to a separate group of terminals, called a terminal cluster and perform a specific group of processing functions, such as path set-up through the group switch 21 and the provision of an interface to the terminals, designated TI, within the terminal cluster. High traffic clusters, such as telephone trunk lines may include up to thirty terminals whereas low traffic clusters, such as telephone subscriber lines may contain up to sixty or more terminals. Each terminal subunit may interface with up to four high traffic clusters; hence it contains four A-type processors, whereas a low traffic subunit may interface with eight low traffic clusters and hence contains eight A-type processors. Each A-processor may include, for example, an Intel Corp. Model 8085 microprocessor interface and associated RAM and ROM memory. Thus, each terminal unit may contain, for example, 1920 or more low traffic terminals (for subscriber lines) or 480 high traffic trunk terminals. Each terminal cluster, such as terminal cluster 44 in terminal subunit 28 includes one A-processor and its associated cluster terminal interface (TI). This cluster terminal interface is coupled by a pair of bidirectional links 46 and 48 respectively to each of two access switches 50 and 52, within terminal subunit 28. The access switching elements, such as access switch elements 50 and 52 of subunit 28 are of the same switching element configuration as are the switching elements of the group switch 21. Access switching elements 50 and 52 each provide access for subunit 28 to one of a pair of a second group of processors, such as processors $B_0$ and $B_1$ in terminal subunit 28. Other pairs of B-type processors are included within terminal subunits 30, 32 and 34, but for purpose of description, only the B-processors of subunit 28 are illustrated. This second group of processors, the B-processor, are dedicated to a second group of processing functions, such as call control (the processing of call related data, such as signalling analysis, translations, etc.) for the terminals interfaced by terminal subunit 28 and may also be implemented by processors such as Intel Corp. microprocessor Model No. 8085.

A security pair of processors is constituted by the inclusion of identical processing functions in B-processors 54 and 56 and the access switches 50 and 52 for terminal subunit 28, thereby allowing each terminal cluster such as the $A_0$ cluster to select either half of the security pair, i.e., either B-processor 54 via access switch 50 or B-processor 56 via access switch 52 in the event of a failure of one half of the security pair, thereby providing an alternate transmission path.

The group switch 21 is a multi-stage and multi-plane switching network arranged in matrix form with four independent planes of switching capability; plane 0 designated 58, plane 1 designated 60, plane 2 designated 62, and plane 3 designated 64. A plurality of planes are provided to meet the traffic and service integrity requirements of the particular system application. Two, three or four planes of switching may be provided, which will service 120,000 or more terminals, i.e., subscriber lines terminating in the aforementioned line circuits, such as disclosed in aforementioned U.S. Pat. No. 4,161,633.

Preferably, each plane 58 through 64 of the group switch 21 may contain up to three stages of switching. The access switch stage, which selects a particular plane for a connection may be located within the individual terminal unit 22, as illustrated in FIG. 1, rather than in the group switch 21, as desired. The particular plane of the group switch 21 to be connected is selected by the access switching stage in the terminal unit. For example, access switching element 50 in terminal subunit 28 can select plane 0 designated 58 via bidirectional communication link 36 and plane 3 designated 64 via bidirectional communication link 40.

Group switch 21 is modularly expandable either by increasing the number of planes to increase data traffic handling performance, or by increasing the number of stages of switching elements or the number of switching elements per stage to increase the number of terminals served by the group switch 21. The number of stages per plane of the group switch 21 is modularly expandable as follows:

Stages 1 and 2 utilize the switching element as an 8×8 two-sided switch, whereas stage 3 utilizes the switching element as a 16-port single-sided switch.

Referring to FIG. 2, a digital switching element 66 is illustrated. The switching element 66 is a multiport single-sided switch illustrated with 16-ports. However, it is to be understood that the number of ports could be greater or less than sixteen, as desired. A single-sided switch may be defined as a switching element having a plurality of ports of bidirectional transmission capability in which data received at any port may be switched to and transmitted by any port (either the same or other port of the switching element). All data transfer from port to port within switching element 66 is accomplished via bit-parallel time division multiplex (TDM) bus 68, which enables space switching which may be defined as the provision of a transmission path between any two ports within the switching element 66.

Each port 0 through 15 of switching element 66 includes its own receive control logic $R_x$ and its own transmit logic $T_x$, illustrated by way of example of port number 7. Data is transferred to and from any port such as port 7 of the switching element 66 from switching elements of like configuration with which switching element 66 is linked in bit-serial format via the receive control input line 70 and transmit control output line 72, respectively, at the 4.096 Mb/s system clock rate, with 512 serial bits constituting a frame, which is subdivided into thirty-two channels of 16-bits each.

Data transmitted serially from the sixteen ports is both rate and phase synchronous, i.e., the transmit control logic Tx of port 1 and the equivalent transmit control logic for the other 15 ports of the switching element 66 all transmit the same 4.096 Mb/s clock rate, and at any instant are transmitting the same bit position of a frame. On the other hand, reception of bit serial data at the receive control logic $R_x$ of port 7 and at all other port of the switching element 66 is rate synchronous only, i.e., there is no necessary relationship with respect to which bit in a frame that any two ports may be receiving at any instant. Thus, reception is phase asynchronous. Receive control logic $R_x$ and transmit control logic $T_x$ each include a control logic portion and a RAM, described with reference to FIG. 3.

In the preferred embodiment, connections are set up through the switching element 66 on a unidirectional (simplex) basis. A simplex connection between an input channel of a port (one of 32 channels) to an output channel of any port (one of 512 channels) is established by an in-channel command referred to as a SELECT command. This SELECT command is contained in the single 16-bit word in the input channel requesting the connection. A number of different types of connections are possible through switching element 66 and these are differentiated by information in the SELECT command. Typical select commands are: "any port, and channel", which is a command that is received by the receive control logic of the port and initiates a connection to any free channel in any outlet of any port; "Port N, Any channel" is another SELECT command which

| STAGE | LINKS PER PLANE | LOCAL APPLICATION LINES | LOCAL APPLICATION TERMINALS | TANDEM APPLICATION TRUNKS |
|---|---|---|---|---|
| 1 ONLY | 8 | 1,000 | 1,000 | 240 |
| 1 and 2 | 64 | 10,000 | 10,000 | 3,500 |
| 1, 2 and 3 | 1,124 | >100,000 | >120,000 | >60,000 | initiates a connection to any free channel in a particular port N, i.e., port 8; "Port N, Channel M" is another SELECT command which initiates a connection to a specified channel M such as channel 5 in a specified port N, such as port 8. Other specialized SELECT commands such as "connect to one of any odd (or even) numbered ports" and specialized channel 16 command and maintenance commands in channel 0 are included in the capacity of a switch port.

The receive control logic $R_x$ for each port synchronizes to the incoming data from another switching element. The channel number (0–31) of the incoming channel is used to fetch destination port and channel addresses from port and channel address storage RAM's. During the port's access time to bus 68, the receive logic $R_x$ sends the received channel word along with its destination port and channel addresses to the TDM bus 68 of switching element 66. During every bus cycle (the time during which data is transferred from a receive control logic $R_x$ to a transmit control logic Tx), every transmit logic $T_x$ at every port looks for its port address on the TDM bus 68. If the port number on the bus 68 corresponds to the unique address of a particular port, the data (channel words) on the bus 68 is written into the data RAM of the recognizing port at an address corresponding to the address read out of the channel RAM of the receive control logic $R_x$ of the originating port. This accomplishes a one-word data transfer from the receive control logic $R_x$ through the TDM bus 68 to the transmit control logic $T_x$ of a port.

Figure 6:
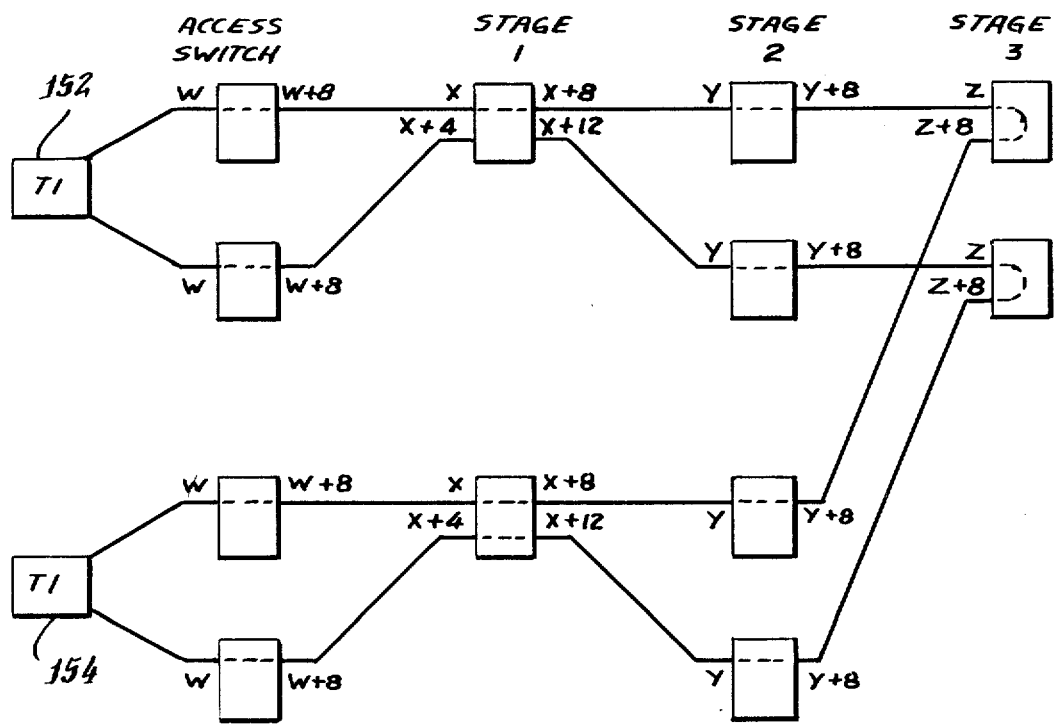
FIG. 6 is a simplified block diagram illustrating a long diagnostic tunnel.

In the distributed control network 20 illustrated in FIG. 1, the A-microprocessors are programmed to perform a series of Network Routine Exercises. The mechanism by which the Network Routine Exercises perform the tests through the switching network is called a tunnel. A tunnel is a uniquely defined spatial path through the switching network which originates at one A-microprocessor or its terminal interface (TI) and terminates at another A-microprocessor or its terminal interface (TI). The network addresses of the two TIs at the ends of each tunnel are algorithimically related since the spatial path therebetween is defined as follows. Every port of a switching element, such as switching element 66, is paired with another port in an n and n+8 pairing, low number with high number. The specific port pairings are: 0 and 8, 1 and 9, 2 and 10, 3 and 11, 4 and 12, 5 and 13, 6 and 14, and 7 and 15. Every port is physically linked on the maximum size network by a PCM line to another port in some other switching element as seen in FIG. 2. A tunnel is the spatial path through the switching network which follows the pairing of the aforementioned port pairs through the switching elements. Since, as seen in FIG. 1, each terminal interface or A-microprocessor has two bidirectional data links into the access switch stage, therefor each terminal interface or A-microprocessor has two tunnels through the switching network which terminate on the same second terminal interface or microprocessor as seen more clearly in FIGS. 6 and 7. However, prior to installation of the complete switching network, the foregoing definition will result in some incomplete tunnels.

The Network Routine Exercises monitor the functional integrity of the switching network on a go-no go basis and are performed along the tunnels. Thus, each A-microprocessor has routine responsibilities for that small portion of the switching network containing within the tunnels which are defined by the network address of its TI. Therefore, the complete switching network is exercised by the combined Network Routine Exercises of all of the switching network tunnels. Typical Network Routine Exercises may include transmission hardware exercises, switch port functional tests, and Network Alarm exercises.

Figure 3:
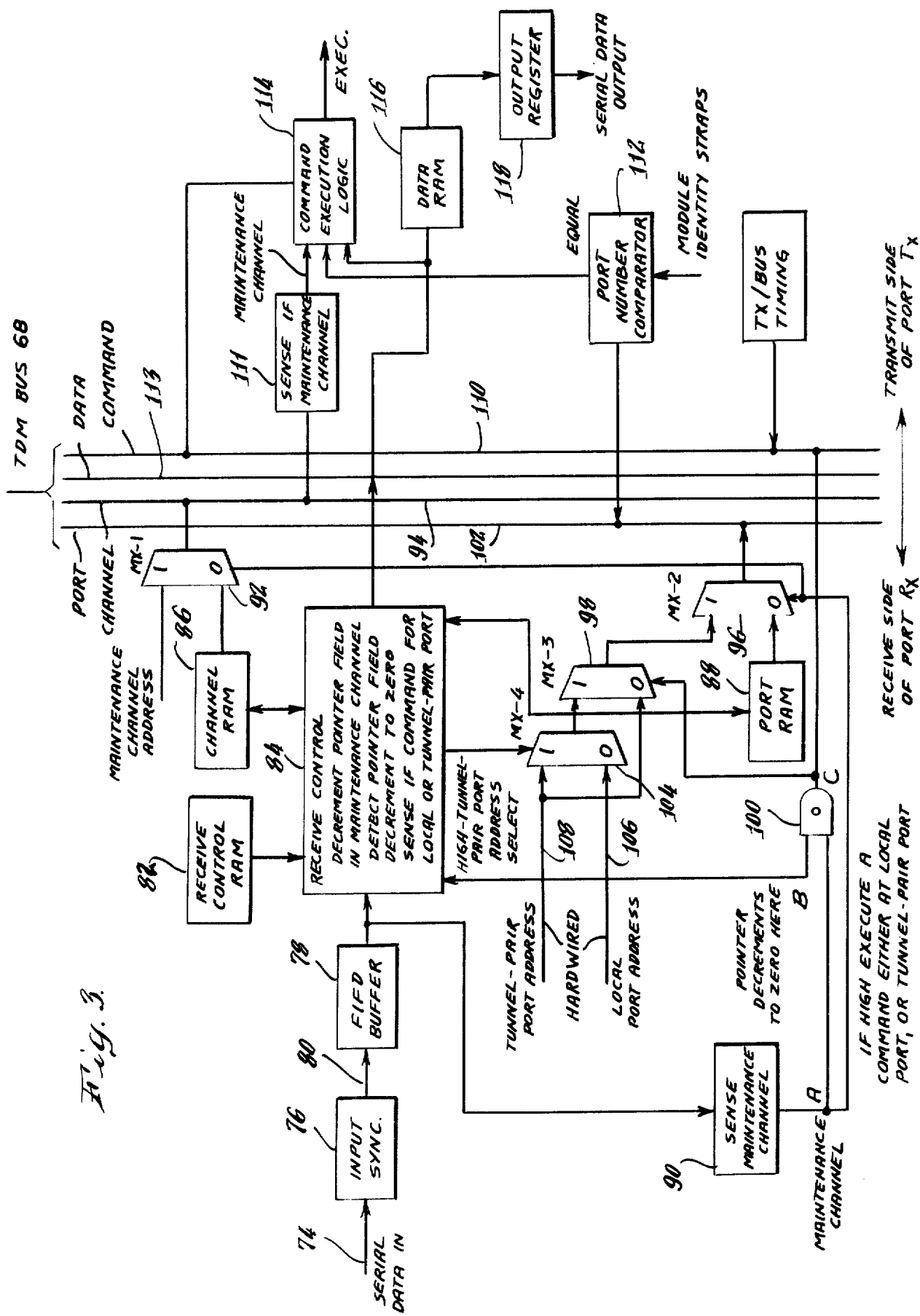
FIG. 3 is a combined block and logic diagram illustrative of the operation of one bidirectional port of the multiport switching element.

One form which the logic present at each port may take for implementing the diagnostic system of the present invention is illustrated by FIG. 3. Serial data at 4.096 Mb/s is received on input line 74 and is coupled to input sync circuit 76 which provides bit and word synchronization to the information on line 74. The output of the input sync circuit 76 is a 16 bit channel word and its channel number (representing the channel position within the frame) which is coupled to a first-in-first-out (FIFO) (FIFO) buffer register stack 78 which synchronizes data on line 80 to the timing of the TDM bus 68. This is required since data on line 74 is asynchronous to the timing of the TDM bus 68. The output from the FIFO buffer 78 is a 16-bit channel word and its 5-bit channel number. The information is contained within protocol bits of the channel word and together with information in the receive control RAM 82 specifies the action to be taken by the receive control circuit 84 for this channel in this frame.

Putting aside the maintenance channel (channel 0), five types of actions may occur, as are more fully described in the aforementioned U.S. Pat. No. 4,201,890. If the protocol is SPATA (speech and data words), the channel word is sent to TDM bus 68 unmodified and the channel address fetches destination port and channel addresses from the channel RAM 86 and the port RAM 88 and couples them to the TDM bus 68 during the port's receive logic bus access time slot.

The receive control logic $R_x$ of each port includes a sense maintenance channel circuit 90 which simultaneously examines the outut of the FIFO buffer 78 to detect whether the channel number corresponds with the maintenance channel (channel 0). If the sense maintenance channel circuit 90 detects output data from the FIFO buffer register stack 78 in the maintenance channel, it generates a maintenance channel signal (A) which causes a data select multiplexer 92 to select the maintenance channel address to couple to the channel bus leads 94 of the TDM bus 68 instead of the output of the channel RAM 86. Additionally, a second data select multiplexer 96 is switched from the output of port RAM 88 to the output of a third data select multiplexer 98, which provides the number of the particular port which is to receive the maintenance channel word.

The maintenance channel word includes a Pointer Field, which the receive control circuit 84 decrements by one if the pointer Field is other than zero, detects if such decrementing of the Pointer Field results in a zero, and detects if the maintenance channel word is for the local port or associated tunnel-pair port. If the Pointer Field is decremented to zero at the receive control circuit 84, a Pointer Zero Signal (B) is generated. The coincidence of the Pointer Zero Signal (B) and the maintenance channel signal (A) at the input to AND gate 100 results in a High Signal (C) at its output. That is, the presence of a High Signal (C) at the output of the AND gate 100 verifies that a maintenance channel word is present and that the Pointer Field has been decremented to zero at this port. Thus, a command is to be executed at the transmit control logic $T_x$ of one of the two tunnel-pair ports at this address in the network. If there is no High Signal (C) present at the output of the AND gate 100, the Pointer Field has not been decremented to zero at this pair port address. Thus, the word in the maintenance channel is to be transmitted across the TDM bus 68 to the transmit control logic $T_x$ of the associated tunnel-pair port. To accomplish this, the data select multiplexer 98 passes the address of the associated tunnel-pair port to data select multiplexer 96, which in turn relays it to the port bus lines 102.

The selection of the local port address 106 or associated tunnel-pair port address 108, both hardwired to data select multiplexer 104 is accomplished by an N/F bit (near side/far side). This bit is included as a part of the maintenance command. If N/F=0, the near side of this switch module is the designated port, and the local port address is selected. If N/F=1, the associated tunnel-pair port is the designated port and that address is selected.

The output of the AND gate 100 is also coupled to command bus leads 110. If the transmit control logic $T_x$ of the port detects the presence of its port number at port comparator 112, a channel address equal to the maintenance channel address via sense maintenance channel unit 111 and the command bus lines 110 active, the coincidence of these signals causes execution of the data present at data bus lines 113. This is accomplished by command execution logic 114. If such coincident signals are not present at command execution logic 114, the data present at the data bus line 113 is transmitted to a data RAM 116 (time slot interchanger) and then to an output register 118 for transmission to a subsequent switching element in the network.

Advantageously, in accordance with the present invention, messages in the maintenance channel of a diagnostic tunnel may originate from a microprocessor, destined for a particular switch port along a predetermined tunnel. Alternately, the messages may originate at a particular switch port along the tunnel, destined for the microprocessors at either end of the tunnel. To accomplish this, the switch port must satisfy three requirements:

(1) It must possess the ability to pass a message along the tunnel through a particular channel, designated, e.g., the maintenance channel;

(2) It must have the ability to recognize and respond to a command message in the maintenance channel which is destined for that port; and (3) Finally, it must possess the ability to insert messages into the maintenance channel.

In order to preselect a particular switching element to receive a command message, each word passing along a tunnel in the maintenance channel carries the aforementioned Pointer Field comprising several bits. As the word is transmitted along a tunnel in the maintenance channel, the Pointer Field is decremented by 1 at each stage of the switching elements. The stage of the switching elements at which the Pointer Field is decremented to zero is the stage for which that command message was destined. Thus, a microprocessor arranged at either end of a tunnel may launch a command message destined for any switching element along that tunnel by presetting the Pointer Field to the appropriate value. Typical commands may be to set or clear control bits within the switch port or the transmit a response message back to the originating microprocessor. Thus, commands may be given to a particular switch port and responses evoked therefrom.

Messages are inserted into a diagnostic tunnel by a switch port in two cases. The first, as previously indicated, is in response to a request from a microprocessor. In this instance, a message is returned in the maintenance channel only to the requesting microprocessor. The second case of message insertion by a switching element occurs when an error condition is detected in a switch port. If either port of a tunnel-pair detects an error condition, an alarm message is outpulsed from both ports of that pair. The alarm messages are inserted with the Pointer Field count set to full scale. The alarm message is transmitted along the tunnel in the same manner as any other message with its Pointer Field decremented at each state of the switching. Upon reception by the microprocessors, each microprocessor may, by examining the remaining count in the Pointer Field, determine which switching element launched the alarm message.

Figure 4:
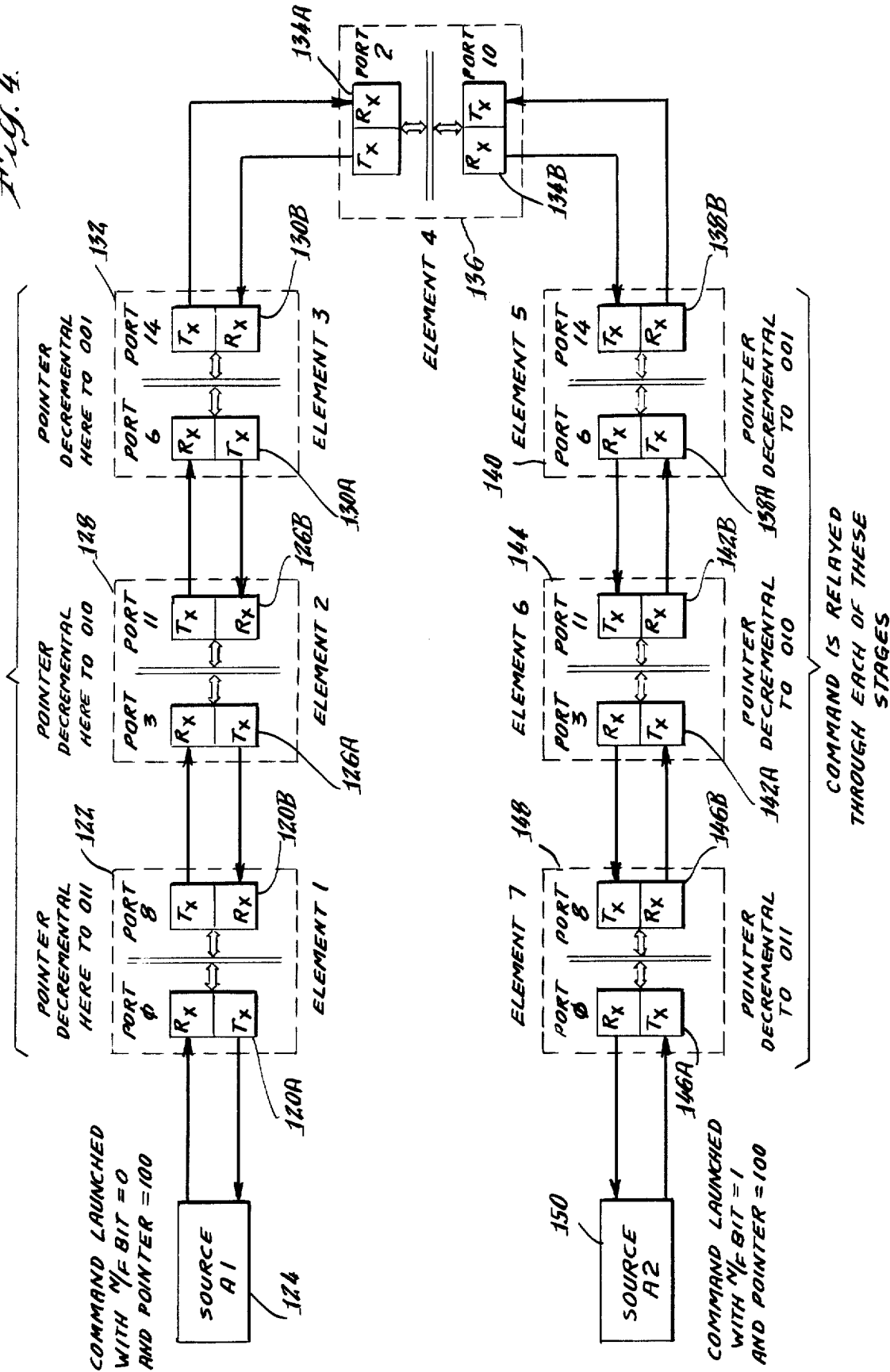
FIG. 4 is a simplified block diagram of a diagnostic tunnel through the switching network in accordance with the present invention.

An example of seven switching elements interconnected to form a diagnostic tunnel is illustrated in FIG. 4. The illustrated tunnel-pair ports have been labeled as elements 1 through 7 for ease of description; however, it should be understood that a tunnel through a complete network will normally include seven tunnel-pair ports through seven different switching elements, as will be discussed more fully with reference to FIG. 6. Bidirectional ports 120A and 120B, intercoupled through TDM bus 68, form the first element 122. This element is electrically connected at one side to an A-microprocessor 124 (terminal interface) and its other side to another pair of intercoupled bidirectional ports 126A and 126B which form a second element 128. This second element 128 is electrically coupled to another pair of intercoupled bidirectional port 130A and 130B which form the third element 132. This third element 132 is electrically coupled to another pair of intercoupled bidirectional ports 134A and 134B which form a fourth element 136. In turn, this fourth element 136 is electrically coupled to another pair of intercoupled bidirectional ports 138 A and 138B which form a fifth element 140. The fifth element 140 is electrically coupled at its other side to another pair of intercoupled bidirectional ports 142A and 142B which form a sixth element 144. The sixth element 144 is electrically coupled at its other side to another pair of intercoupled bidirectional ports 146A and 146B which form the seventh element 148. Coupled to the other side of the seventh element 148 is another A-microprocessor 150.

Each pair of tunnel-paired ports is formed from one or two LSI chips. Each associated pair of ports are cross-coupled at the $T_x$ logic control portions thereof by links 121A and 121B so that the current alarm and maintenance status of each port may be known to the other port.

With reference to FIG. 4, let us assume it is desired to send a message along the diagnostic tunnel to a particular port along the tunnel. Assuming a tunnel having seven switching elements, the number association of paired ports for each switching element is port N with port N+8. If a message is to be sent, e.g., from A-microprocessor 124 to port number 2 (134A) of the fourth element 136, it is apparent port 2 (134A) is on the near side of switching element 136, four stages away from A-microprocessor 124. Thus, the A-microprocessor 124, which has a particular address in the network relative to the destined port, sends out the desired message with the Pointer Field equal to 1$\emptyset\emptyset$ and NF bit=$\emptyset$. Alternatively, viewed from microprocessor 150, port 2 (134A) is on the far side of the fourth element 136. Thus, the command launched from A-microprocessor 150 would have a Pointer Field initialized at 1∅∅ and an N/F bit set at 1. However, it should be apparent that the Pointer Field launched from the A-microprocessors 124 and 150 and intended for a particular element will normally not have the same digital value.

As the launched command is relayed from A-microprocessor 124 through switching elements 122, 128 and 132, the Pointer Field is decremented by one binary digit at the receive control logic circuit $R_x$ of each element 122, 128 and 132 and transmitted to the next switching element in the tunnel. The particular element for which the command is destined, here element 136, reads the received Pointer Field of 001 and this proceeds to decrement it to zero. When the Pointer Field has been decremented to zero, the command is executed at the transmit logic circuit $T_x$ of element 136. Specifically, at port 2 (134A) since port 2 received the command and the command had the N/F bit=∅, indicating the near side of element 136. Likwise, as the launched command propagates from A-microprocessor 150 through switching elements 148, 144 and 140, the Pointer Field is decremented by one binary digit and transmitted to the next element. The particular switching element for which the command is destined, here element 136, reads the Pointer Field of 001 and proceeds to decrement it to zero. When the Pointer Field has been decremented to zero, the command is executed at element 136. However, since N/F bit=∅, the command is first relayed to the far side of the switching element 136 or port 2.

Moreover, each port along a tunnel may also originate information destined for the A-microprocessors 124 or 150. When a port originates information, the Pointer Field is set to full scale, i.e., with respect to the illustration in FIG. 4, the Pointer Field is set to 111. The A-microprocessors 124 and 140 which receive the information, can determine, based on the value remaining in the Pointer Field, from which element the command message was launched.

Figure 5:
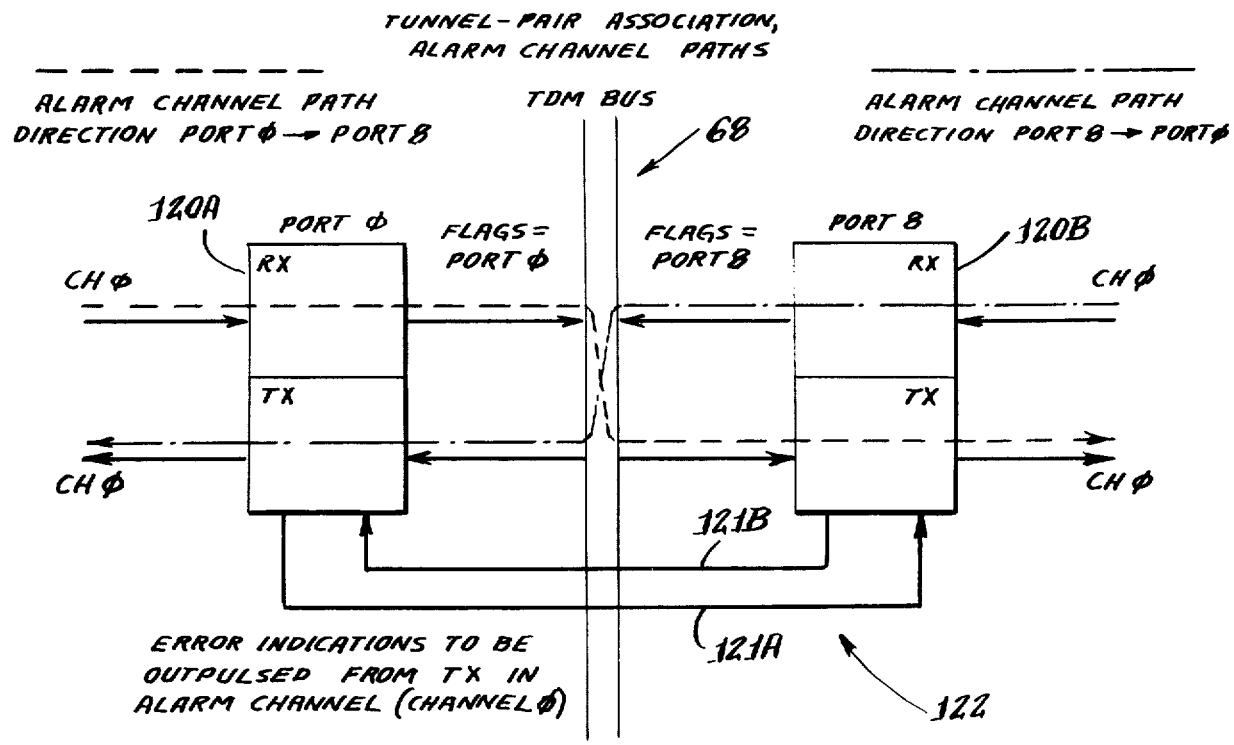
FIG. 5 is a block diagram showing the path of an alarm message through a pair of associated bidirectional ports.

Referring to FIG. 5, if an error condition is detected in either port of an element, e.g., element 122, by hardware error detectors (not shown), the following actions occur. Alarm messages (flags) are inserted into the outgoing maintenance channels from both ports. The alarm messages are inserted with the Pointer Field count set to full scale for transmission to A-microprocessors 125 and 150. The alarm messages, as illustrated in FIG. 5, are transmitted along the maintenance channel paths from the ports of individual element 122. Error conditions sensed on a port are monitored at the transmit logic portion $T_x$ of that port. The $T_x$ portions of the two tunnel-paired ports 120A and 120B are cross-connected by leads 121A and 121B, and thus able to monitor each other's present maintenance and alarm status. The presence of an error condition on either port is thus known to both. Flags (i.e., digital signals typically indicative of a hardware error condition) are indicative of an error on port 0 (120A) and are outpulsed on line 121A to port 8 (120B), and flags from port 8 (120B) are outpulsed on line 121B to port 0 (120A). Thus, an error in either port 120A or 120B will result in outpulses from the element 122 in both directions from the transmit logic portion $T_x$ of ports 120A and 120B.

The alarm message flags may include: near side port hardware alarm, far-side port hardware alarm, near-side port loss of sync, and far-side port loss of sync. The hardware alarm flag has been discussed with reference to FIG. 5. Additionally, a loss—of—sync alarm is generated at the receive control logic $R_x$ of a port when the incoming PCM signal is out of synchronization with the clock. Detection of this condition cause a "loss-of-sync" alarm code, along with a pointer field of 111 to be sourced from the transmit logic portions of both tunnel-paired ports.

FIGS. 6-11 illustrative various paths through the switching network which the diagnostic tunnels may take. Specifically, referring to FIG. 6, when the switching network is completed, the diagnostic tunnel may traverse the entire switching newtork, so called "long tunnels". They interconnect one terminal interface 152 (microprocessor) to another terminal interface 154 (microprocessor) through the access switch stage and all group switch stages 21. As seen in FIG. 1, each terminal 22, 24 and 26 includes as a terminal subunit up to four traffic clusters, i.e., four A-type processors or up to eight low trafffic clusters, i.e., eight A-type processors. Each terminal cluster such as terminall cluster 154 includes one A-processor and its associated cluster terminal interface (TI), represented in block form in FIG. 6. Long tunnels interconnect TIs, such as 152 and 154, which have their PCM links to the access switch stage connected to low numbered inlets, i.e., 0, 1, 2 and 3. All Network Routine Exercises for group switch integrity access the group switch 21 via these tunnels.

Figure 7:
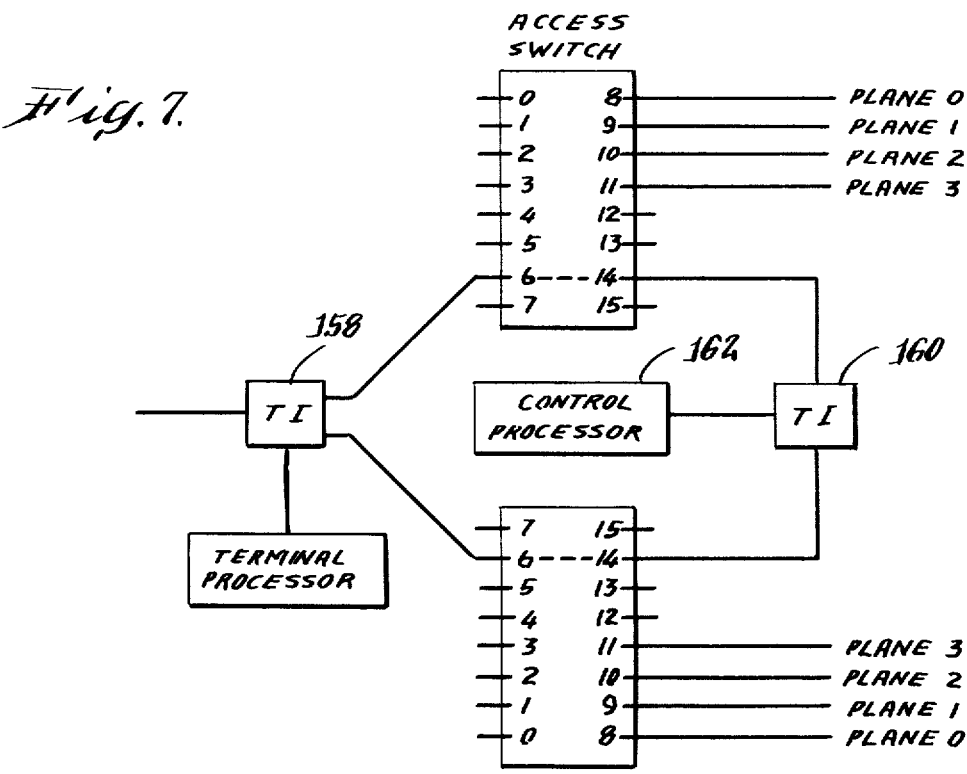
FIG. 7 is a simplified block diagram illustrating a short diagnostic tunnel through the access switch of the switching network.

Referring to FIG. 7, the diagnostic tunnel may traverse only the access switch stage, so called "short tunnels". They interconnect TIs, such as 158 and 160, which have their PCM data links to the access stage switch connected to high numbered inlets, i.e., 4, 5, 6 and 7, and 12, 13, 14 and 15, to interface with, e.g., a call control processor 162 (B-microprocessor).

Figure 8:
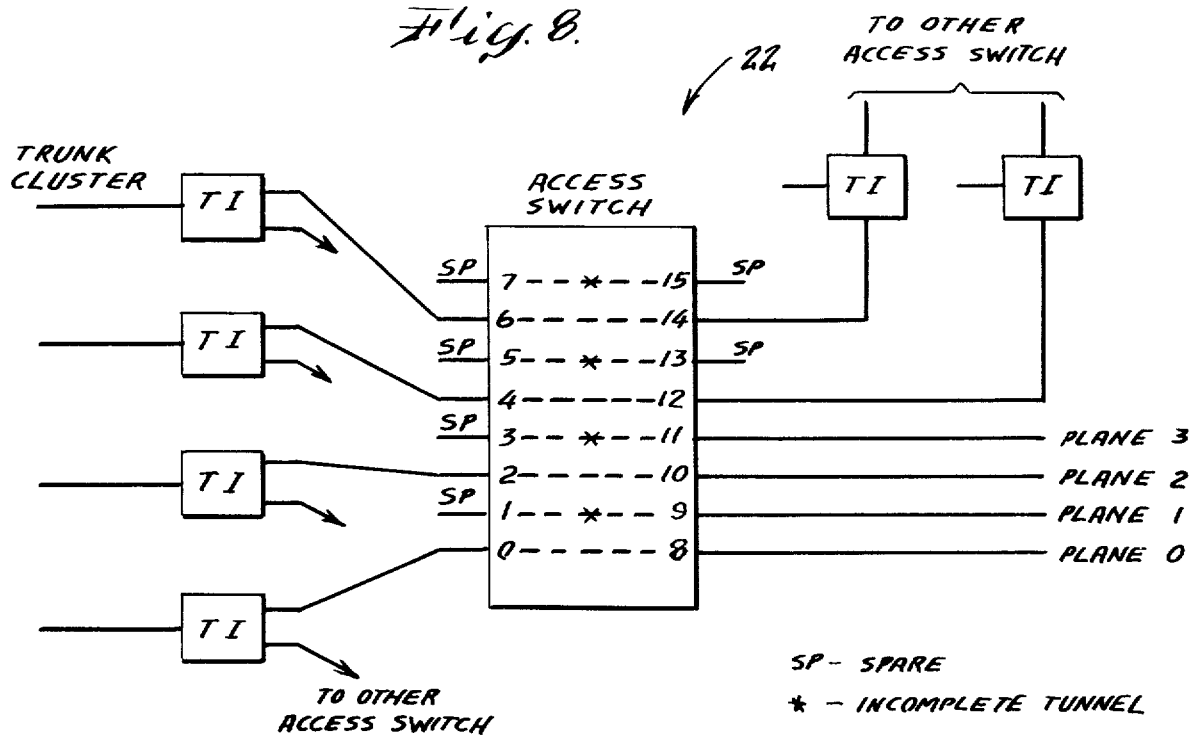
FIG. 8 is a simplified block diagram showing incomplete diagnostic tunnels in the access switch.
Figure 9:
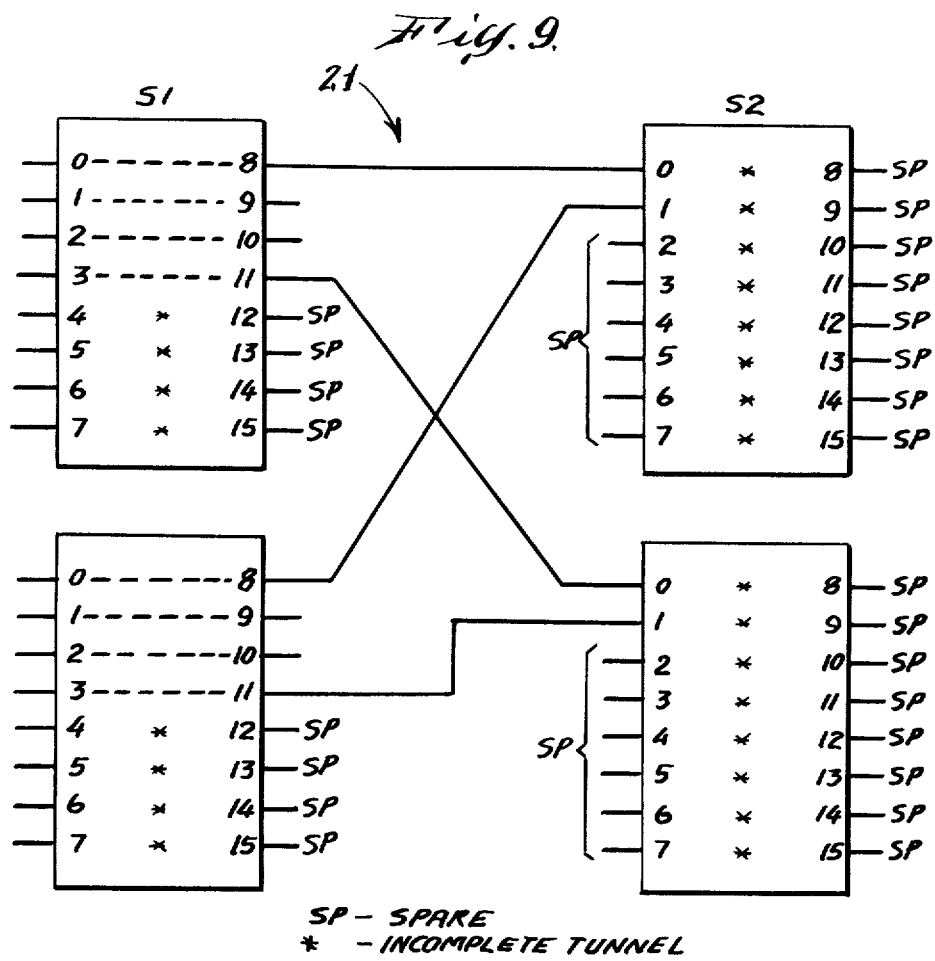
FIG. 9 is a simplified block diagram showing incomplete diagnostic tunnels in the group switch.

Referring to FIGS. 8 and 9, incomplete tunnels will exist in the network when ports exist, but are not yet in use. This may occur in the access switch stage as shown in FIG. 8 or in the group switch as shown in FIG. 9. A spare port is indicated by SP. An asterisk indicates an incomplete tunnel in these figures. Thus, in FIG. 8, square ports exist at ports 1, 3, 5, 7, 13 and 15 of the access switch, resulting in incomplete tunnels between the tunnel-pair ports. Likewise, in FIG. 9, spare ports exist in stages 1 and 2 of the group switch, resulting in incomplete tunnels between the tunnel-pair ports as indicated.

Figure 10:
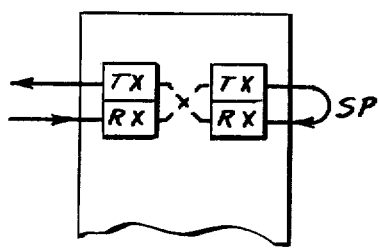
FIG. 10 is a simplified block diagram illustrating a spare port looped to form a single ended diagnostic tunnel called a cave.
Figure 11:
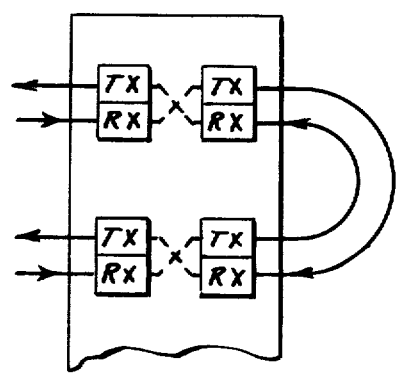
FIG. 11 is a simplified block diagram illustrating two spare ports looped and cross-coupled to form a cross-tunnel.

To facilitate diagnosis along incomplete tunnels, various physical changes may be made to the spare ports. Specifically, as shown in FIG. 10, the receive logic portion $R_x$ and transmit logic portion $T_x$ of a spare port may be physically interconnected to create a single ended tunnel which may be called a "cave". Further, as shown in FIG. 11, the receive logic portion $R_x$ and transmit logic portion $T_x$ of two spare ports may be interconnected in a cross-coupled manner as shown, to create a cross tunnel which may be accessed from both ends.

The network address of a terminal interface (TI) or A-microprocessor is given by the switching element inlet ports through which a connection must be made to reach the TI or A-microprocessor from stage 3 of the switching network. Thus, a general TI or A-microprocessor address is [Aw, Bx, Cy, Dz], where:

Aw=Access Switch Inlet Number
Bx=First Stage Inlet Number
Cy=Second Stage Inlet Number
Dz=Third Stage Inlet Number.

Referring again to FIG. 6, the tunnel address uniquely identifies a complete tunnel in terms of the spatial links which form the tunnel. The tunnel address is derived from the network address of either of the TIs which terminate the tunnel. The following tunnel address sequences are derived from a TI with the address [Aw, Bx, Cy, Dz]. The long tunnel address sequence is valid if $0 \leq Aw \leq 3$. The two tunnels on the TI are defined by the sequence:

Tunnel address $1 = Aw+8$; $|Bx+8|_{16}$ $|Cy+8|_{16}$ $|Dz+8|_{16}$ $Cy$; $Bx$; $Aw$ Tunnel address $2 = Aw+8$; $|Bx+12|_{16}$ $|Cy+8|_{16}$ $|Dz+8|_{16}$ $Cy$; $Bx+4$; $Aw$ The TI address at the other end of both of these tunnels is $[Aw; Bx; Cy; Dz+8]$.

The short tunnel is valid if $4 \leq Aw \leq 7$. The two tunnels on the TI are defined by the sequence.

Tunnel address $= Aw + 8$.

Thus, it can be seen that the physical interconnections of individual switch modules (each pair of associated bidirectional ports of one switching element is connected by a PCM line to another pair of associated bidirectional ports on some other switching element) together with the hardware port associations from uniquely spatially separate tunnels. Assuming a 16-module switch element, eight tunnels pass through a switch element. Moreover, each tunnel may terminate at each end in a terminal interface to a processor. The processor at either end of a tunnel can launch maintenance commands destined for any switch port along the tunnel, and any port can launch alarm messages along the tunnel toward the processor. Thus, maintenance commands may be transmitted in parallel with normal data transmission through the network.

It should be understood by those skilled in the art that various modifications may be made in the present invention without departing from the spirit and scope thereof, as described in the specification and defined in the appended claims.

What is claimed is:

1. A diagnostic system for a distributed control switching network interconnected to a plurality of data processors, each of the data processors having a unique address and having diagnostic data stored therein for use in performing diagnostics in a designated portion of the switching network, comprising:
   a plurality of digital switching elements within said designated portion of the switching network, each of said digital switching elements including a plurality of bidirectional ports for receiving and transmitting digital signals, and each of said bidirectional ports having a unique address in the network algorithmically related to the unique addresses of designated data processors;
   means for providing bidirectional communication paths from each of said data processors to said algorthimically related addressed digital switching elements within the designated portions of the switching network addressable by said designated data processors;
   means associated with said processors for providing diagnostic paths over said bidirectional communication paths between said digital switching elements and said data processors so that each of said data processors is interconnected to another data processor by connection paths equal in number to the number of bidirectional communication path originating from said data processor so that the addresses of said data processors are algorithmically related to the addresses of said bidirectional ports connected thereto by said diagnostic paths, such that the interconnected data processors perform diagnostics over the portion of the switching network that includes the ports having addresses algorithmically related to said interconnected processors.

2. The diagnostic system recited in claim 1, wherein: said bidirectional ports within each digital switching element are intercoupled through a bus.

3. The diagnostic system recited in claim 1 wherein said means for providing a diagnostic path includes:
   logic means associated with each of said bidirectional ports for detecting the address of an incoming digital signal and relaying it along said diagnostic path to the addressed port.

4. The diagnostic system recited in claim 3, wherein: said logic means includes receive control means for decrementing the address of the incoming digital signal and detecting if the incoming digital signal is designated for that port or for another port along said diagnostic path such that said address is decremented at each port until the decremented digital value corresponds to the address of the designated port.

5. The diagnostic system recited in claim 3, wherein: said logic means includes means for setting a flag signal in response to detection of the receipt by a processor of data representative of an error condition at a port;
   means for interconnecting an associated pair of said bidirectional ports within the same switching element of said switching networks with said flag setting means so that the flag signal is transmitted simultaneously from both bidirectional ports of said switching element along said diagnostic paths to said processors coupled thereto.

6. The diagnostic system recited in claim 1, further including:
   means for generating a maintenance signal;
   means associated with each of said bidirectional ports for detecting the presence of said maintenance signal; and
   means for relaying said maintenance signal through the network along said diagnostic paths to the proper directional port.

7. The diagnostic system recited in claim 1, wherein: said data processors include means for encoding pointer field addresses in their digital output signals, said pointer field addresses being algorithimically related to the addresses of said bidirectional ports along said diagnostic paths;
   means associated with each of said bidirectional ports for digitally decrementing the pointer field as the digital output signals from said data processors are relayed through the network along said diagnostic paths, until said pointer field is decremented to a predetermined value indicative of the destination port to which communication is to be established.

8. The diagnostic system recited in claim 7, wherein: said decrementing means includes means for detecting when the pointer field has been decremented to zero.

9. The diagnostic system recited in claim 1, wherein:

said plurality of bidirectional ports are arranged within each switching element in pairs for relaying of diagnostic data along said diagnostic paths.

10. A diagnostic for a distributed control digital switching network including a plurality of data processors having diagnostic data stored therein for use in the digital switching network, said diagnostic system comprising:
- a plurality of digital switching elements, each digital switching element including a plurality of bidirectional ports arranged in pairs for receiving or transmitting digital signals at either port of said pairs of bidirectional ports, each of said bidirectional ports having a unique address in a designated portion of the network;
- means for providing a plurality of bidirectional communication paths from each of the data processors, each of said processors being associated with a designated portion of said network, to certain of said switching elements each of which switching elements being associated with corresponding designated portions of the network; and
- means associated with said data processors for providing a plurality of spatially separate diagnostic paths, each of said diagnostic paths beginning at one of said data processors, interconnecting pairs of bidirectional ports in different switching elements and terminating at another of said data processors, each of said diagnostic paths having a unique network address, and being associated with a designated portion of the network, such that said network is divided into a plurality of designated portions, each having its own distributed diagnostic system.

11. The diagnostic system recited in claim 10, wherein:
each of said pairs of bidirectional ports include transmit and receive logic means which in the case of a spare port are intercoupled to provide a transmission path which is accessible from said transmit and receive logic means of said bidirectional port associated with the spare port.

12. The diagnostic system recited in claim 10, wherein:
each of said pairs of bidirectional ports include transmit and receive logic means which in the case of spare ports of different pairs of bidirectional ports are intercoupled to provide cross-looped tunnels interconnecting the transmit and receive logic means of said spare ports, respectively, to provide a pair of cross-coupled tunnel paths through each of the spare ports, one of said cross-coupled tunnel paths being accessible from said intercoupled receive and transmit logic means of said bidirectional port associated with one of said spare ports and the other cross-coupled tunnel path being accessible from said intercoupled receive and transmit logic means of said bidirectional port associated with the other of said spare ports.

13. The diagnostic system recited in claim 10, wherein:
said pairs of bidirectional ports which comprise each of said diagnostic paths have unique addresses in the network which are algorithmically related only to the addresses of said data processors which begin and terminate each of said diagnostic paths, so that said diagnostic paths each correspond to a particular designated portion of said network.

14. A method for locating faults in a distributed control switching network having a plurality of digital switching elements interconnected to a plurality of data processors having unique addresses and diagnostic data stored therein for use in the network, whereby diagnostic paths are set up through said switching elements comprising the steps of:
distributing the diagnostics for designated portions of the network in a plurality of processors each associated with a designated portion of the network, the digital switching elements of which form a plurality of bidirectional ports, a plurality of which bidirectional ports are associated with each of said digital switching elements;
transmitting diagnostic information to the bidirectional ports within each digital switching element into a plurality of port modules;
establishing a plurality of diagnostic paths through the switching network, each of which begins at one data processor, follows a predetermined path through the port modules of different switching elements and terminates at another data processor so that each of said diagnostic paths is spatially separate and associated with a designated portion of the network; and
algorithmically relating the addresses of the port modules of each of said diagnostic paths to the addresses of said data processors which begin and terminate said diagnostic paths.

15. The method of claim 14, including the further step of pairing the bidirectional ports within each digital switching element.

16. The method recited in claim 15, including the further step of limiting each diagnostic path includes only one pair of bidirectional ports from each switching element.

17. The method recited in claim 15, including the further step of intercoupling a spare port with its associated pair port to provide a diagnostic path therethrough.

18. The method recited in claim 15, including the further step of intercoupling the spare ports of two different pairs of ports with one another to provide a pair of diagnostic paths therethrough which are accessible from either of their associated pair ports.

* * * * *